(12) United States Patent
Connor et al.

(10) Patent No.: US 11,656,845 B2
(45) Date of Patent: *May 23, 2023

(54) DOT PRODUCT CALCULATORS AND METHODS OF OPERATING THE SAME

(71) Applicant: Movidius Limited, Schiphol-Rijk (NL)

(72) Inventors: Fergal Connor, Dundalk (IE); David Bernard, Kilcullen (IE); Niall Hanrahan, Corrandulla (IE)

(73) Assignee: Movidius Limited, Schiphol-Rijk (NL)

( * ) Notice: Subject to any disclaimer, the term of this patent is extended or adjusted under 35 U.S.C. 154(b) by 102 days.

This patent is subject to a terminal disclaimer.

(21) Appl. No.: 17/243,282

(22) Filed: Apr. 28, 2021

(65) Prior Publication Data

US 2021/0247961 A1   Aug. 12, 2021

Related U.S. Application Data

(63) Continuation of application No. 17/001,455, filed on Aug. 24, 2020, now Pat. No. 11,023,206, which is a continuation of application No. 16/184,985, filed on Nov. 8, 2018, now Pat. No. 10,768,895.

(51) Int. Cl.
  *G06F 7/544* (2006.01)
  *G06F 17/16* (2006.01)
  *G06F 7/523* (2006.01)

(52) U.S. Cl.
  CPC .......... *G06F 7/523* (2013.01); *G06F 7/5443* (2013.01); *G06F 17/16* (2013.01)

(58) Field of Classification Search
  CPC ................................ G06F 7/5443; G06F 17/16
  See application file for complete search history.

(56) References Cited

U.S. PATENT DOCUMENTS

| 10,768,895 | B2 | 9/2020 | Connor et al. |
| 11,023,206 | B2 | 6/2021 | Connor et al. |
| 2016/0358069 | A1 | 12/2016 | Brothers et al. |
| 2018/0121377 | A1 | 5/2018 | Woo et al. |

(Continued)

OTHER PUBLICATIONS

International Searching Authority, "International Search Report and Written Opinion," issued in connection with application No. PCT/EP2019/080136 dated Feb. 3, 2020, 16 pages.

(Continued)

*Primary Examiner* — Chuong D Ngo
(74) *Attorney, Agent, or Firm* — Hanley, Flight & Zimmerman, LLC

(57) ABSTRACT

Methods, apparatus, systems and articles of manufacture to perform dot product calculations using sparse vectors are disclosed. An example apparatus includes means for generating a mask vector based on a first logic operation on a difference vector and an inverse of a control vector, the control vector based on a first bitmap of a first sparse vector and a second bitmap of a second sparse vector; means for generating a first product of a third value from the first sparse vector and a fourth value from the second sparse vector, the third value based on (i) the mask vector and (ii) a second sparsity map based on the first sparse vector, the fourth value corresponding to (i) the mask vector and (ii) a second sparsity map corresponding to the second sparse vector; and means for adding the first product to a second product of a previous iteration.

30 Claims, 6 Drawing Sheets

(56) References Cited

U.S. PATENT DOCUMENTS

| | | | |
|---|---|---|---|
| 2018/0189234 A1* | 7/2018 | Nurvitadhi | G06F 17/16 |
| 2018/0218518 A1 | 8/2018 | Yan et al. | |
| 2018/0330235 A1 | 11/2018 | Lin et al. | |
| 2019/0115933 A1 | 4/2019 | Chen et al. | |
| 2019/0278828 A1 | 9/2019 | Park et al. | |
| 2020/0150926 A1 | 5/2020 | Connor et al. | |
| 2020/0387350 A1 | 12/2020 | Connor et al. | |

OTHER PUBLICATIONS

Willner et al., "Manipulation of Sparse Vectors on a Vector Processor," IP.com, published on Feb. 1, 1980, 4 pages.

Jain-Mendon, Shweta et al., "Performance Evaluation of Sparse Matrix-Matrix Multiplication," 23rd International Conference on Field Programmable Logic and Applications, Sep. 2, 2013, pp. 1-4, 5 pages.

Yavits, Leonid et al., "Accelerator for Sparse Machine Learning," IEEE Computer Architecture Letters, vol. 17, No. 1, published on Jun. 12, 2017, pp. 21-24, 5 pages.

United States Patent and Trademark Office, "Notice of Allowance," issued in connection with U.S. Appl. No. 16/184,985, dated Apr. 27, 2020, 8 pages.

United States Patent and Trademark Office, "Corrected Notice of Allowability," issued in connection with U.S. Appl. No. 16/184,985, dated Jun. 16, 2020, 2 pages.

United States Patent and Trademark Office, "Notice of Allowance," issued in connection with U.S. Appl. No. 17/001,455, dated Jan. 22, 2021, 7 pages.

International Searching Authority, "International Preliminary Report," issued in connection with Application No. PCT/EP2019/080136, dated May 11, 2021, 8 pages.

European Patent Office, "Communication pursuant to Rules 161(1) and 162 EPC," issued in connection with Application No. 19798070.9, dated Jun. 15, 2021, 3 pages.

* cited by examiner

DOT PRODUCT CALCULATORS AND METHODS OF OPERATING THE SAME

RELATED APPLICATION

This patent arises from a continuation of U.S. patent application Ser. No. 17/001,455, (now U.S. patent Ser. No. 11/023,206) entitled "DOT PRODUCT CALCULATORS AND METHODS OF OPERATING THE SAME," filed on Aug. 24, 2020 which is a continuation of application Ser. No. 16/184,985, (now U.S. Pat. No. 10,768,895) entitled "DOT PRODUCT CALCULATORS AND METHODS OF OPERATING THE SAME," filed on Nov. 8, 2018. U.S. patent application Ser. No. 17/001,455 and U.S. patent application Ser. No. 16/184,985 are hereby incorporated herein by reference in their entirety. Priority to U.S. patent application Ser. No. 17/001,455 and U.S. patent application Ser. No. 16/184,985 is hereby claimed.

FIELD OF THE DISCLOSURE

This disclosure relates generally to processors, and, more particularly, to dot product calculators and methods of operating the same.

BACKGROUND

In recent years, a demand for image processing capabilities has moved beyond high-power dedicated desktop hardware and has become an expectation for personal and/or otherwise mobile devices. Mobile devices typically include processing capabilities that are limited by size constraints, temperature management constraints, and/or power constraints.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
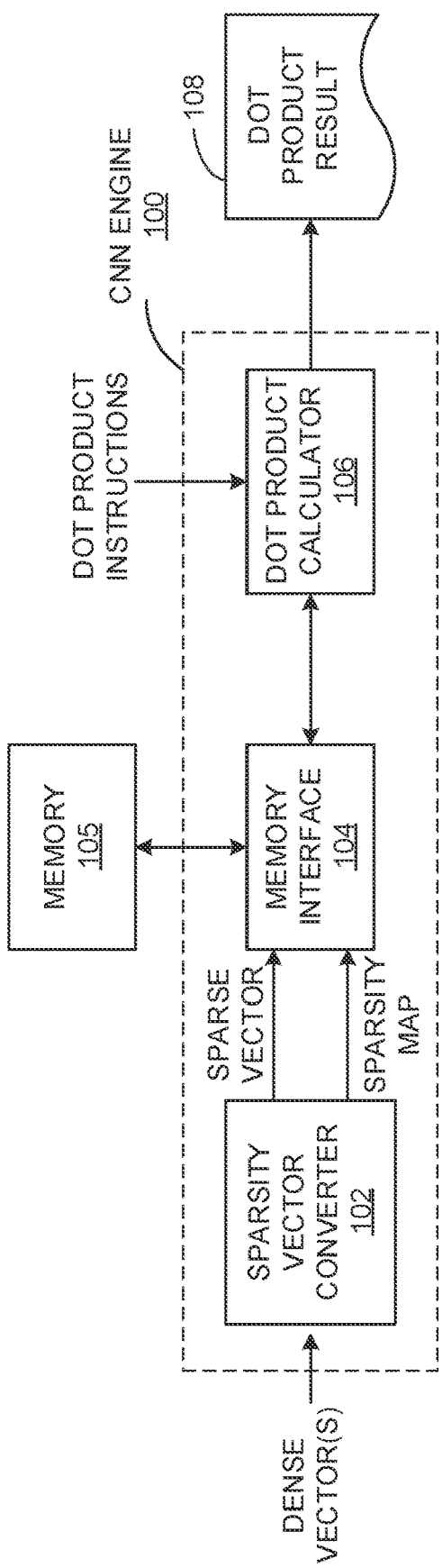
FIG. 1 is a block implementation of the diagram of an example convolutional neural network engine.

Typical computing systems, including personal computers and/or mobile devices, employ advanced image processing or computer vision algorithms to automate tasks that human vison can perform. Computer vision tasks include acquiring, processing, analyzing, and/or understanding digital images. Such tasks facilitate, in part, extraction of dimensional data from the digital images to produce numerical and/or symbolic information. Computer vision algorithms can use the numerical and/or symbolic information to make decisions and/or otherwise perform operations associated with three-dimensional (3-D) pose estimation, event detection, object recognition, video tracking, etc., among others. To support augmented reality (AR), virtual reality (VR), robotics and/or other applications, it is then accordingly important to perform such tasks quickly (e.g., in real time or near real time) and efficiently.

Advanced image processing or computer vision algorithms sometimes employ a convolutional neural network (CNN, or ConvNet). A CNN is a deep, artificial neural network typically used to classify images, cluster the images by similarity (e.g., a photo search), and/or perform object recognition within the images using convolution. As used herein, convolution is defined to be a function derived from two given functions by integration that expresses how a shape of one of the functions is modified by a shape of the other function. Thus, a CNN can be used to identify faces, individuals, street signs, animals, etc., included in an input image by passing an output of one or more filters corresponding to an image feature (e.g., a horizontal line, a two-dimensional (2-D) shape, etc.) over the input image to identify matches of the image feature within the input image.

CNNs obtain vectors (e.g., broken down from multi-dimensional arrays) that need to be stored or used in computations to perform one or more functions. Thus, a CNN may receive multi-dimensional arrays (e.g., tensors or rows of vectors) including data corresponding to one or more images. The multi-dimensional arrays are broken into vectors. Such vectors may include thousands of elements. Each such element may include a large number of bits. A vector with 10,000 16 bit elements corresponds to 160,000 bits of information. Storing such vectors requires a lot of memory. However, such vectors may include large numbers of elements with a value of zero. Accordingly, some CNNs or other processing engines may break up such a vector into a sparse vector and a sparsity map vector (e.g., a bitmap vector).

As defined herein, a sparse vector is a vector that includes all non-zero elements of a vector in the same order as a dense vector, but exclude all zero elements. As defined herein, a dense vector is an input vector including both zero and non-zero elements. As such, the dense vector [0, 0, 5, 0, 18, 0, 4, 0] corresponds to the sparse vector is [5, 18, 4]. As defined herein, a sparsity map is a vector that includes one-bit elements identify whether respective elements of the dense vector is zero or non-zero. Thus, a sparsity map may map non-zero values of the dense vector to '1' and may map the zero values of the dense vector to '0'. For the above-dense vector of [0, 0, 5, 0, 18, 0, 4, 0], the sparsity map may be [0, 0, 1, 0, 1, 0, 1, 0] (e.g., because the third, fifth, seventh, and eight elements of the dense vector are non-zero). The combination of the sparse vector and the sparsity map represents the dense vector (e.g., the dense vector could be generated/reconstructed based on the corresponding sparse vector and sparsity map). Accordingly, a CNN engine can generate/determine the dense vector based on the corresponding sparse vector and sparsity map without storing the dense vector in memory.

Storing a sparse vector and a sparsity map in memory instead of a dense vector saves memory and processing resources (e.g., providing there are sufficient zeros in the dense vector(s)). For example, if each element of the above-dense vector (e.g., [0, 0, 5, 0, 18, 0, 4, 0]) was 16 bits of information, the amount of memory required to store the dense vector is 128 bits (e.g., 8 elements×16 bits). However, the amount of memory required to store the corresponding sparse vector (e.g., [5, 18, 4]) and the sparsity map (e.g., 0, 0, 1, 0, 1, 0, 1, 0]) is 64 bits (e.g., (the 3 elements of the sparse vector×16 bits)+(8 elements of the sparsity map×1 bit)). Accordingly, storing the sparse vector and sparsity map instead of a corresponding dense vector reduces the amount of memory needed to store such vectors. Additionally, utilizing sparse vectors and sparsity maps improves bandwidth requirements because you decrease the amount of data being delivered into a computational engine, to increase the delivery speed to the compute engine.

Some programs or applications may call for a dot product/ scalar product between two input vectors (e.g., dense vectors). In some circumstances, the input vectors may already be stored in memory as sparse vectors and a sparsity maps corresponding to the input vectors. Conventionally, when the dot/scalar product is called, a processor accesses the corresponding sparse vectors and sparsity maps from memory to regenerate the corresponding dense vectors. The dense vectors are then written in local memory. Therefore, conventional techniques store the dense vectors as input vectors into local memory prior to calculating the dot product. Once accessed, the process performs a conventional dot product calculation where each element of one dense vector is multiplied by a corresponding element of the other dense vector and the products are summed together. For example, if the first dense vector is [5, 412, 0, 0, 0, 4, 192] and the second dense vector is [2, 0, 0, 432, 52, 4, 0], conventional dot product techniques perform seven multiplication calculations and sum the seven products together (e.g., (5·2)+(412·0)+(0·0)+(0·432)+(0·52)+(4·4)+(192·0)). However, such conventional techniques require X number of multiplication calculations, where X corresponds to the number of elements in either input vector. Multiplication calculations are complex, slow to execute, and require a large amount resources to perform. As explained against the background below, examples disclosed herein conserve memory, increase dot product calculation speeds, and require less processing resources than conventional dot product techniques.

Examples disclosed herein perform a dot/scalar product calculation without performing any multiplication calculation of any element that is zero (e.g., since the product of any number and zero is zero). Instead, examples disclosed herein perform simpler, computationally light computations based on sparsity maps. In this manner, the number of complex, computation heavy multiplication calculations are reduced. As a result, the amount of time needed to perform a dot product calculation is reduced. For example, as described above, if the first dense vector is [5, 412, 0, 0, 0, 4, 192] and the second dense vector is [2, 0, 0, 432, 52, 3, 0], the number of complex multiplication calculations for examples disclosed herein is reduced to two (e.g., (5·2) and (4·3)), as opposed to the seven multiplication calculations required by conventional techniques. Examples disclosed herein perform simple calculations (e.g., logic AND, subtraction by 1, binary counts of vectors, etc.) to identify which elements need to be multiplied, thereby reducing the processing resources needed to determine a dot product and increasing the speed it takes to perform such a dot product calculation. Additionally, because examples disclosed herein perform the dot/scalar product calculation based on the sparsity maps, the amount of local memory required to calculate a dot product between two vectors is reduced and the speed of such calculations is increased (e.g., by eliminating trivial computations involving multiplication by zero).

FIG. 1 is a block diagram of an example CNN engine 100 (e.g., a convolution neural network engine). The CNN engine 100 includes a sparsity vector converter 102, an example memory interface 104, example memory 105, and an example dot product calculator 106. The example CNN engine 100 receives dense vectors or inputs and outputs an example dot product result 108.

The example sparsity vector converter 102 of FIG. 1 receives the dense vector(s) and converts the dense vector(s) into sparse vector(s) (e.g., a vector including only the non-zero values of the received vector) and sparsity map(s) (e.g., a bitmap identifying to which elements of the dense vector are zero and which elements of the vector are non-zero). For example, if the sparsity vector converter 102 receives the eight-by-one dense vector [0;0;532;0;1432;4;0; 0;1], the sparsity vector converter 102 converts the eight-by-one dimension dense vector into a four-by-one dimension sparse vector (e.g., [532; 1432; 4; 1]) including the non-zero values of the dense vector and eliminating the zero values of the dense vector. The sparsity vector converter 102 also generates an eight-by-one dimension sparsity map (e.g., [0;0;1;0;1;1;0;0;1]) representing each element of the received dense vector with a single bit identifying whether the corresponding element is zero or non-zero (e.g., '0' when the corresponding element of the vector is '0' and '1' when the corresponding element of the vector is non-zero). The dense vector (e.g., a vector with both zero values and non-zero value) can be reconstructed from the sparse vector (e.g., a vector with only the non-zero values of the dense vector) using the sparsity map (e.g., a bitmap vector of the dense vector). However, storing a sparse vector and a sparsity map requires less memory than storing a dense vector, when the dense vector includes sufficient zero-valued elements. For example, if each element of the above dense vector corresponds to 16 bits, then the number of bits required to store the dense vector is 72 bits (e.g., 9 elements×8 bits=72 bits). However, because the corresponding sparse vector only includes 4 elements and the corresponding sparsity map only requires one bit per element, storing the corresponding sparse vector and sparsity map requires 41 bits (e.g., (4 elements×8 bits)+(9 elements×1 bit)=41 bits). In some examples, the dense vector(s) are obtained from another processor. In some examples, the dense vector(s) are obtained from a user via a user interface. The example sparsity vector converter 102 transmits the generated sparse vector(s) and sparsity map(s) corresponding to the dense vector(s) to the example memory interface 104.

The example memory interface 104 of FIG. 1 interfaces with the example memory 105 to store the generated sparse vector(s) and sparsity map(s) and access information in the example memory 105. For example, when the memory interface 104 receives a sparse vector and a sparsity map corresponding to a dense vector, the memory interface 104 stores the sparse vector and sparsity map in the example memory 105. When a dot/scalar product function is called, the dot product calculator 106 instructs the memory interface 104 to access one or more sparsity maps and/or one or more memory addresses of corresponding to values of elements of the sparse vectors to be utilized in the dot/scalar product calculation. The memory interface 104 access is the information from the example memory 105 and returns the requested information (e.g., sparse vector values) to the example dot product calculator 106.

The example memory 105 of FIG. 1 stores sparse vectors and corresponding sparsity maps. For example, the memory 105 stores each element of a sparse vector in one or more addresses in the memory 105. In this manner, each element of the sparse vector corresponds to the one or more memory addresses. Accordingly, when the memory interface 104 receives instructions to access an element of a sparse vector corresponding to a position within the sparse vector, the memory interface 104 can access the element at the requested position within the sparse vector based on the address where the element is stored.

The example dot product calculator 106 of FIG. 1 calculates a dot/scalar product between two vectors using the sparse vectors and sparsity maps corresponding to the two sparse vectors. For example, instead of calculating a dot product between the two vectors using a conventional technique, which requires storing the entire dense vectors into local memory and performing element-by-element multiplication calculations, the example dot product calculator 106 calculates the dot product based on the sparsity maps to identify elements in the sparse vectors for multiplication. This approach takes up less space in memory and requires fewer multiplication calculations than traditional techniques. Because the example dot product calculator 106 performs the dot product calculations with less complex computations, the dot product calculator 106 is able to determine the dot product using less memory, less processing resources, and greater speed than conventional dot product techniques. Once calculated, the example dot product calculator 106 outputs the example dot product result 108. The example dot product result 108 may be output to the user and/or may be output to another processor, application, and/or used in a subsequent process within the CNN engine 100 or entered to the CNN engine 100. An example implementation of the example dot product calculator 106 is further described below in conjunction with FIGS. 2 and 3.

Figure 2:
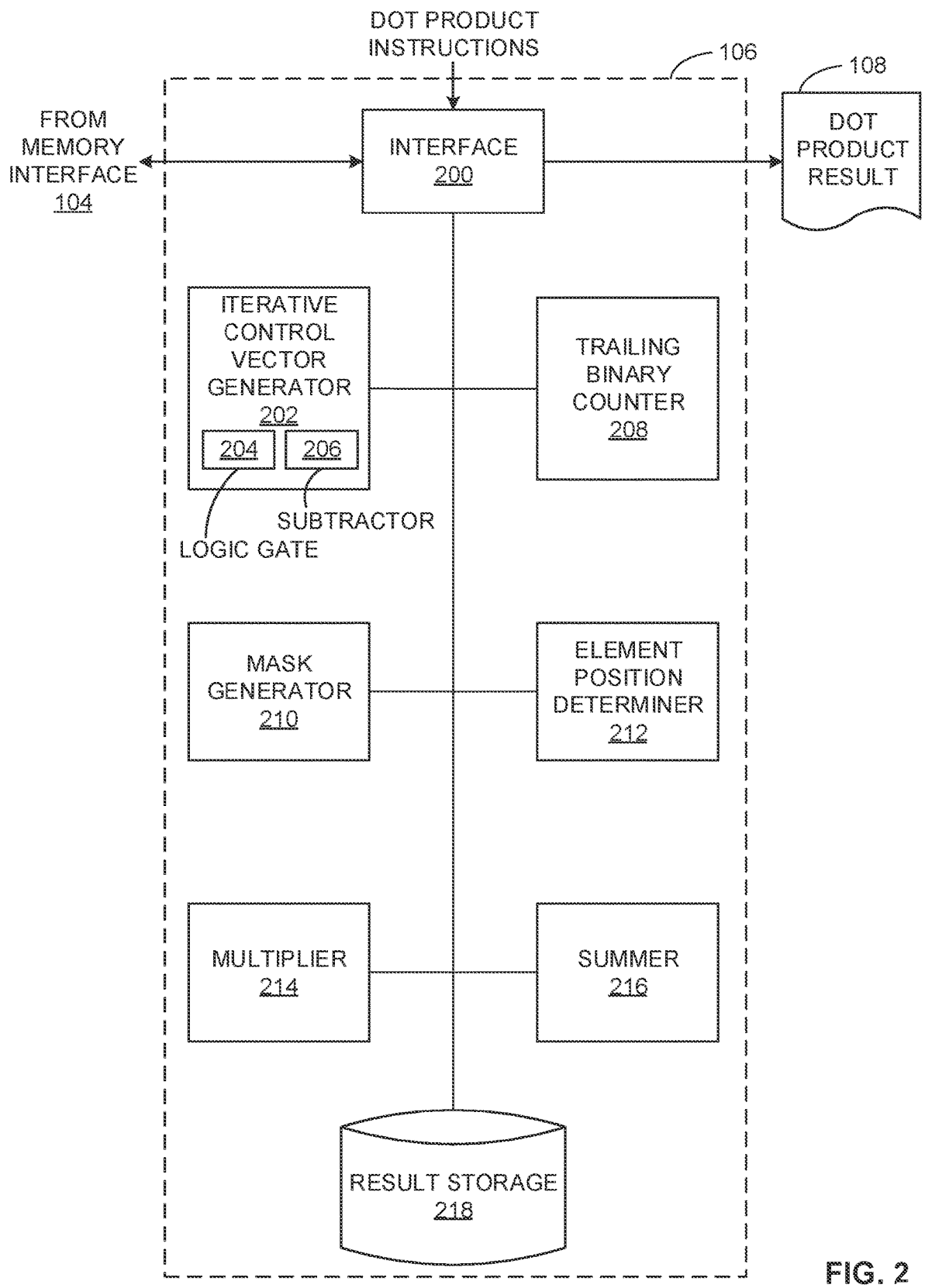
FIG. 2 is a block diagram of an example implementation of the dot product calculator of the example processor of FIG. 1.

FIG. 2 is a block diagram of an example implementation of the dot product calculator 106 of FIG. 1. The example dot product calculator 106 of FIG. 2 includes an example interface 200, an example iterative control vector generator 202, an example logic gate 204, an example subtractor 206, an example trailing binary counter 208, an example mask generator 210, an example element position determiner 212, an example multiplier 214, an example summer 216, and an example result storage 218.

The example interface 200 of FIG. 2 receives dot product instructions. For example, a user, application, and/or program may transmit instructions to perform a dot product on two vectors (e.g., vector A and vector B). Additionally, the interface 200 communicates with the memory interface 104 of FIG. 1 to access sparsity bits maps and/or values of the input vectors A and B. Additionally, the example interface 200 outputs the example dot product result 108 once the result has been calculated (e.g., determined).

The example iterative control vector generator 202 of FIG. 2 generates a control vector (e.g., vector C) and updates the control vector with each iteration of the dot product protocol. Initially, the iterative control vector generator 202 generates the control vector based on the sparse maps of the input vectors A and B (e.g., sparsity maps $A_M$ and $B_M$). For example, the example logic gate 204 of the iterative control vector generator 202 generates the initial control vector C by performing a logic AND function/operation of the sparse maps $A_M$ and $B_M$. The iterative control vector generator 202 generates the control vector C (e.g., based on the $A_M$ AND $B_M$) to isolate the non-zero elements of the dense vectors that need to be multiplied together. During a subsequent iteration of the dot product protocol, the example iterative control vector generator 202 updates the control vector C by performing a logic AND function based on the control vector C and a difference vector C−1 (e.g., corresponding to the value of the control vector C minus one), thereby eliminating the trailing one for a subsequent iteration. In this manner, a subsequent iteration will isolate a different elements from the dense vectors until there are no more trailing ones to be isolated. The subtractor 206 of the iterative control vector generator 202 calculates a difference vector (e.g., C−1) by subtracting a bit value of one from each of the values of the control vector C. For example, if the control vector C is [1, 0, 0, 0] (e.g., 8 in decimal), the subtractor 206 generates the vector C−1 to be [0, 1, 1, 1] (e.g., 7 in decimal). Once the subtractor 206 calculates the difference vector (e.g., C−1), the example logic gate 204 performs a logic AND function with vector C and vector C−1 to generate a new/updated control vector. The example iterative control vector generator 202 updates the control vector for the subsequent iteration by replacing the control vector C with the new control vector (e.g., C=C AND (C−1)). The example iterative control vector generator 202 determines that the dot product protocol is complete (e.g., there are no more iterations to run), when the elements of the new control vector are all the same binary value (e.g., every element is a 0).

The example trailing binary counter 208 of FIG. 2 counts the number of trailing zeros of a vector (e.g., the number of least significant bits that correspond to a zero before a non-zero value occurs in the vector). For example, for the vector [0, 1, 0, 1, 0, 0, 0], the trailing binary counter 208 determines that the number of trailing zeros is three, because the three least significant bits (e.g., the bits furthest to the right in the vector) of the vector are zero before a non-zero value of one occurs in the vector. In another example, for the vector [0, 0, 0, 1], the trailing binary counter 208 determines that the number of trailing zeros is zero, because the there are no trailing zeros in the vector (e.g., the least significant bit is one). The trailing zero count corresponds on the control vector corresponds to the location of the element in the dense vectors. To locate these elements in the sparse vectors, a mask vector is generated to isolate the bits from the sparsity maps and using the ones count on the result. In the dot product protocol, after the iterative control vector generator 202 generates or updates a control vector, the trailing binary counter 208 determines the number of trailing zeros in the control vector. In other examples, the trailing binary counter 208 may count a number of ones values of a vector (e.g., if the vector was inversed). Additionally or alternatively, the example logic gate 204 may perform logic functions for other parts of the dot protocol. For example, the logic gate 204 may perform a logic AND function with the sparsity maps $A_M$/$B_M$ and a mask (e.g., generated by the mask generator 210). In this manner, the element position determiner 212 of this example determines an element position of a value in the sparse vectors stored in the memory 105 needed for the dot product protocol, as further described below.

The example mask generator 210 of FIG. 2 generates a mask vector based on the trailing binary count and the number of elements in the input vectors. For example, if the trailing zero count is four and the number of values in each input vector is 7, the mask generator 210 will generate a mask vector with the same dimensions as the input vectors where the four least significant bits are '1' and the rest of the bits are '0' (e.g., [0, 0, 0, 1, 1, 1, 1]). In another example, if the trailing zero count is zero and the number of values in each input vector is 4, the mask generator 210 will generate a mask vector with the same dimensions as the input vectors where none of the bits are '1' (e.g., because the trailing zero count is zero) and the rest of the bits are '0' (e.g., [0, 0, 0, 0]). The mask isolates the elements you want to skip over and zero out anything beyond the element you are interested in. Once the example mask generator 210 generates the mask vector, the example logic gate 204 performs a logic AND function on the sparsity map $A_M$ and the mask vector to generate a first result, and, the logic gate 204 performs a logic AND function on the sparsity map $B_M$ and the mask vector to generate a second result. Although the mask vector is generated to isolate the elements of interest, there may be other ways to isolate the elements of interest (e.g., the elements to be multiplied). For example, the example mask generator 210 may generate the mask vector by subtracting the control vector by 1 (e.g., C−1), enumerating an inverse off the control vector C, and the example logic gate 204 may perform a logic AND function to the control vector minus 1 and itself with the inverse of the control vector C.

The example element position determiner 212 of FIG. 2 determines a first position of an element in the sparse vector $A_S$ based on a ones count of the first result and a second position of an element in the sparse vector $B_S$ based on the ones count of the second result. For example, if the first result (e.g., $A_M$ AND mask) results in a vector with five '1's, then the element position determiner 212 determines that the value needed for the dot product protocol is the fifth position of the sparse vector $A_S$. In such an example, if the second result (e.g., $B_M$ AND mask) results in a vector with zero '1's, then the element position determiner 212 determines that the value stored needed for the dot product protocol is the zero$^{th}$ position of the sparse vector $B_S$. Additionally, the element position determiner 212 instructs the interface 200 to access the values stored in the determined positions from the respective sparse vectors stored in the example memory 105.

The example multiplier 214 of FIG. 2 multiplies the values accessed by the example interface 200 (e.g., corresponding to the positions determined by the element position determiner 212). Once multiplied, the example summer 216 sums the product with a previous result stored in the result storage 218. Initially the value stored in the result storage 218 is zero and is updated after each of the iterations of the dot product protocol. In this manner, during the initial iteration, the multiplier 214 multiplies the values accessed by the interface 200 and stores the product in the result storage 218. During a subsequent iteration, the multiplier 214 multiples the values accessed by the interface 200 and the summer 216 sums the product with the previously stored result (e.g., a sum of product(s) from previous iteration(s)). Once the example iteration control vector generator 202 determines that the dot product protocol is complete (e.g., there are no more iterations to perform because the new control vector includes only zero values), the interface 200 access the result in the result storage 218 and output the result as the dot product result 108. An example of the dot product protocol with two example vectors is further described below in conjunction with FIG. 4.

Figure 3:
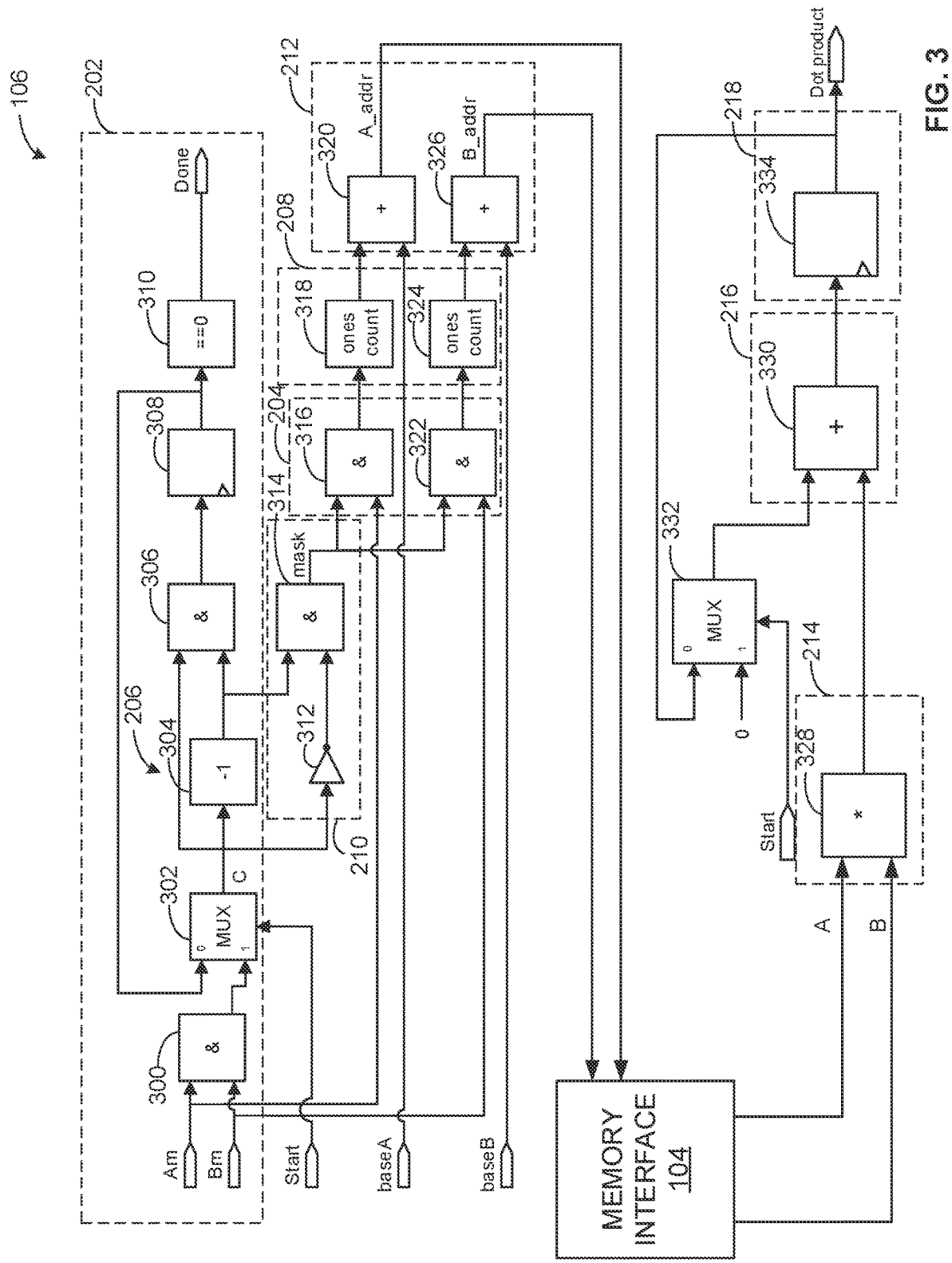
FIG. 3 is hardware diagram of the example implementation of the dot product calculator of FIG. 1.

The example CNN engine 100 of FIG. 2 may be implemented in part by a processor executing instructions. FIG. 3 is a diagram of another example implementation of the dot product calculator 106 of FIG. 1. In the example of FIG. 3, the dot product calculator 106 is implemented by hardware (e.g., in dedicated circuitry). In some examples, the hardware of FIG. 3 is integrated inside a processor (e.g., in the processor package, a part of a system on a chip, etc.). The example dot product calculator 106 of FIG. 3 includes example AND logic gates 300, 306, 314, 316, 322 example multiplexers (MUXs) 302, 332, an example subtractor 304, example registers 308, 328, 334, an example comparator 310, an example NOT gate 312, example one counters 318, 324, and example summers 320, 326, 330. In some examples, the example components 300, 302, 304, 306, 308, 310 may be used to implemented the example iterative control vector generator 202, the example logic AND gates 316, 322 may be used to implement the logic gate 204, the example component 304 may be used to implement the subtractor 206, the example ones counters 318, 324 may be used to implement the trialing binary counter 208, the example components 312, 314 may be used to implement the example mask generator 210, the example summers 320, 326 may be used to implement the example element position determiner 212, the example multiplier 328 may be used to implemented the example multiplier 214, the example summer 330 may be used to implement the example summer 216, and the example register 334 may be used to implement the example result storage 218 of FIG. 2.

When a user, application, and/or a device (e.g., another processor) transmits instructions to determine a dot/scalar product based on two sparse vectors (e.g., As and Bs), the two corresponding sparsity maps (e.g., Am and Bn) are obtained from the example memory 105 via the example memory interface 104 by the example AND logic gate 300. The example AND logic gate 300 performs an AND logic function to generate a control vector C. The AND logic gate 300 outputs the control vector C to the example MUX 302. The example MUX 302 receives a start signal to identify when the dot/scalar product calculation has started. As further described below, in conjunction with the example of FIG. 4, the sparsity maps Am, Bm are utilized initially to determine the control vector. However, subsequent iterations update the control vector without utilizing the sparsity maps Am and Bi. Accordingly, after the example AND logic gate 300 determines the first control vector C, the example MUX 302 no longer forwards the initial control vector for further calculation. Rather, the MUX 302 outputs the subsequent control vector (e.g., generated by the example components 304, 306, 308, as further described below).

The example MUX 302 of FIG. 3, when enabled by the start signal, outputs the output of the example AND logic gate 300 to the example subtractor 304 (e.g., the initial control vector). The example MUX 302, when not enabled by the start signal, outputs the output of the example register 308 (e.g., a subsequent control vector). The example subtractor 304 subtracts the control vector by a value of one (e.g., C−1) and the example AND logic gate 306 performs a logic AND function with the control vector (C) and the control vector minus one (C−1) to generate a subsequent control vector for a subsequent iteration that is stored in the example register 308. The example comparator 310 determines if the subsequent control vector is equal to zero. If the subsequent control vector is equal to zero, then the dot product process is complete and the comparator 310 outputs a trigger voltage indicative of the end of the process. If the subsequent control vector is not equal to zero, the process continues with the subsequent control vector.

While the example components 306, 308 of FIG. 3 compute the subsequent control vector for a subsequent iteration, the example components 304, 312, 314 generate a masking vector for the current iteration. In the example of FIG. 3, the masking vector (e.g., a vector corresponding to the trailing zero count of the control vector) is generated based on a logic AND function of the control vector minus one (C−1) and the inverse of the control vector. Accordingly, the example subtractor 304 generates the control vector minus one while the example logic NOT gate 312 (e.g., an inverter) computes the inverse of the control vector. The example logic AND gate 314 performs a logic AND function of the inverse of the control vector and the control vector minus one, resulting in the mask vector. Additionally or alternatively, there may be different hardware components to generate the mask vector.

Once the mask vector is calculated, the example logic AND gate 316 of FIG. 3 performs a logic AND function with the first sparsity map Am and the example logic AND gate 322 performs a logic AND function with the second sparsity map Bn. The example ones counter 318 computes the total number of ones of the output of the example logic AND gate 316 (e.g., ones_count(Am AND mask)) and the example ones counter 324 computes the total number of ones of the output of the example logic AND gate 322 (e.g., ones_count (Bm AND mask)). The example summer 320 adds the ones count of the example ones counter 318 to the base address of the sparse vector. The summer 326 adds the ones count of the example ones counter 324 to the base address of the sparse vector Bs. Accordingly, the output of the summer 320 corresponds to the address of the element of the sparse vector As that should be multiplied for the current iteration and the output of the summer 326 corresponds to the address of the element of the sparse vector Bs that should be multiplied during the current iteration.

The addresses of the sparse vector As, Bs (e.g., A_addr and B_addr) are transmitted to the example memory interface 104 to obtain the values stored in the addresses from the example memory 105 of FIG. 1. Once obtained, the example memory interface 104 transmits the corresponding values (e.g., A and B) to the example multiplier 328 to multiply the values. The example multiplier 328 outputs the product to the example summer 330 to add the product to a product of a previous iteration. If there is no previous iteration, the example summer 330 adds zero to the product, as further described below. The output of the example summer 330 is stored in the example register 334. The register 334 stores the sum of the products of the previous iterations. When the dot/scalar product calculation is complete (e.g., when all iterations are complete), the register 334 stores and outputs the dot product. For example, the register 334 output the final dot/scalar product after receiving an output of the example comparator 310 corresponding to the computation completion (e.g., the done signal).

The example register 334 of FIG. 3 outputs the currently stored value a first input of the example MUX 332. The example MUX 332 further includes a second input corresponding to zero and a select input corresponding to a start signal. In this manner, when the dot product calculation is initiated, the MUX 332 will output a zero. The zero value is provided to the summer 330 to add with the product of the initial iteration. However, after the first iteration, the start signal changes and the MUX 332 will output the output of the example register 334. As described above, the output of the example register 334 includes the sum of the product of all previous iterations. Accordingly, the summer 330 adds the product of the current iteration to the sum of products of previous iterations, thereby corresponding to the dot product when all iterations are complete.

Figure 4:
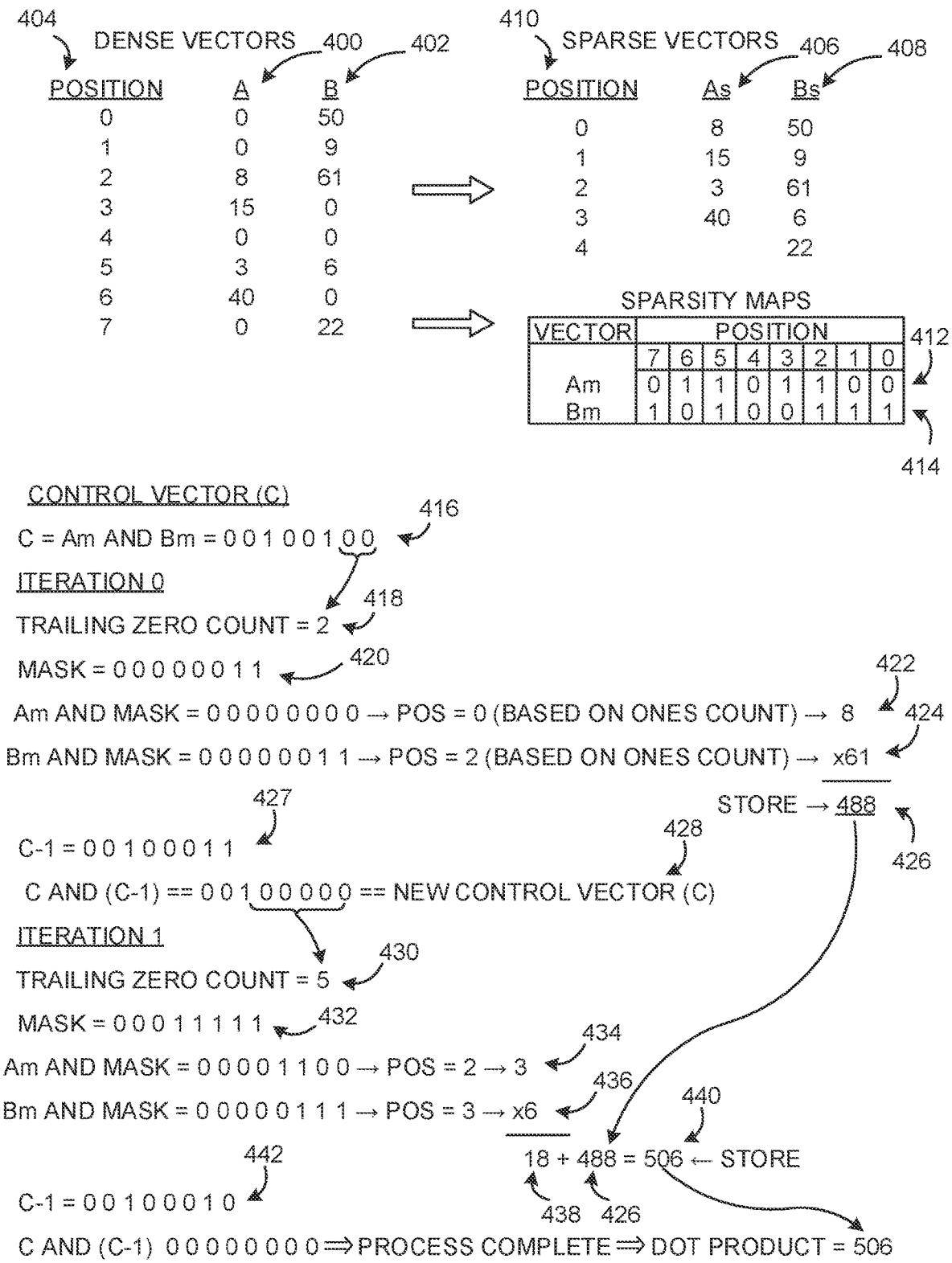
FIG. 4 is an example of a dot product protocol performed by the example dot product calculator of FIGS. 1, 2, and/or 3.

FIG. 4 illustrates an example the dot product protocol operation by the example dot product calculator 106 of FIGS. 2 and/or 3. FIG. 4 includes example dense vectors 400, 402, an example position identifiers 404, example sparse vectors 406, 408, example element positions of the sparse vectors 410, example sparsity maps 412, 414, an example control vector 416, examples trailing zero counts 418, 430, example masks 420, 432, example sparse vector values 422, 424, 434, 436, example products 426, 438, example difference vectors 427, 442, an example updated control vector 428, and an example dot product result 440.

The example dense vectors 400, 402 of FIG. 4 correspond to vectors that may be identified for use in a dot product operation. The example position identifiers 404 correspond to the positions of the elements within the dense vectors 400, 402. As described above, the sparsity vector converter 102 converts the dense vectors 400, 402 into the example sparse vectors 406, 408 and the example sparsity maps 412, 414. The sparse vector 406 corresponds to the non-zero values of the example dense vector 400 listed in the same order as in the dense vector 400. The sparse vector 408 corresponds to the non-zero values of the example dense vector 402 listed in the same order as in the dense vector 400. The values of the sparse vectors 406, 408 are indexed by the example element positions 410 (0-4). The sparsity map 412 is a bitmap vector corresponding to whether the elements of the dense vector 400 in each position identifier 404 corresponds to a zero value or a non-zero value. For example, because the $2^{nd}$, $3^{rd}$, $5^{th}$ and $6^{th}$ positions of the dense vector 400 corresponds to non-zero values, the sparsity map 412 includes a '1' in the $2^{nd}$, $3^{rd}$, $5^{th}$, and $6^{th}$ positions. The sparsity map 414 likewise corresponds to a bitmap vector of the dense vector 402.

When the interface 200 receives instructions to perform a dot product for the dense vectors 400 and 402, the dot product calculator 106 accesses the sparsity maps 412, 414 and the iterative control vector generator 202 generates the example control vector 416 by performing a logic AND function with the example sparsity map 412 and the example sparsity map 414. During the first iteration (e.g., iteration 0), the trailing binary counter 208 determines that the example trailing zero count 418 is two because there are two trailing zeros in the control vector (e.g., the two least significant bits of the control vector are zero before there is a one in the control vector). Accordingly, the example mask generator 210 generates the example mask vector 420 based on the trailing zero count 418. For example, the mask generator 210 generates the mask vector 420 to have the two least significant bits (e.g., two bits equal the trailing zero count of 2) to be '1' and the remaining bits to be '0.' Although the example mask vector 420 is generated to isolate the elements of interest, there may be other ways to isolate the elements of interest (e.g., the elements to be multiplied). For example, the example mask generator 210 may generate the example mask vector 420 by subtracting the control vector by 1 (e.g., C−1), enumerating an inverse off the control vector C, and the example logic gate 204 may perform a logic AND function to the control vector minus 1 and itself with the inverse of the control vector C.

Once the mask generator 210 generates the mask vector 420, the logic gate 204 performs a logic AND function with the mask 420 and the first sparsity map 412. The element position determiner 212 determines a position based on the ones count of the result from the logic gate 204. For example, in FIG. 4, the element position determiner 212 determines the position to be zero because there are no ones in the result of $A_M$ AND mask. The interface 200 accesses the value of the sparse vector 406 in the $0^{th}$ position from the memory 105 to return the value 422 of 8 (e.g., the $0^{th}$ value of the sparse vector 406). Likewise, the mask generator 210 generates the mask vector 420, the logic gate 204 performs a logic AND function with the mask and the second sparsity map 414. The element position determiner 212 determines an element position based on the ones count of the result from the logic gate 204. For example, in FIG. 4, the element position determiner 212 determines the position to be two because there are two ones in the result of $B_M$ AND mask. The interface 200 accesses the element/value in the $2^{nd}$ position of the sparse vector 408 from the memory 105 to return the value 424 of 61 (e.g., the $2^{nd}$ value of the sparse vector 408).

Once the interface 200 accesses the corresponding values 422, 424 (e.g., 8 and 61), the example multiplier 214 multiples the corresponding values 422, 424 to generate the first example product 426 (e.g., 8×61=488). The first example product 426 is stored into the example result storage 218. After the first Iteration is complete, the example iterative control vector generator 202 subtracts the control vector 416 by one (e.g., C−1) to generate the example difference vector 427. The control vector generator 202 performs a logic AND operation with the control vector 416 and the difference vector 427. Because the result includes a non-zero value (e.g., [0, 0, 1, 0, 0, 0, 0, 0]), the iterative control vector generator 202 determines that a subsequent iteration is needed and replaces the control vector 416 with the example new control vector 428.

During the second iteration (e.g., iteration 1), the trailing binary counter 208 determines that the example trailing zero count 430 is five because there are five trailing zeros in the control vector 428 (e.g., the five least significant bits of the control vector are zero before there is a one in the control vector). Accordingly, the example mask generator 210 generates the example mask vector 432 based on the trailing zero count 430. For example, the mask generator 210 generates the mask vector 432 to have the five least significant bits to be '1' and the remaining bits to be '0.'

Once the mask generator 210 generates the mask vector 432, the logic gate 204 performs a logic AND function with the mask and the first sparsity map 412. The element position determiner 212 determines an element position based on the ones count of the result from the logic gate 204. For example, in FIG. 4, the element position determiner 212 determines the position to be two because there are two ones in the result of $A_M$ AND mask. The interface 200 accesses the element/value stored in the $2^{nd}$ position of the sparse vector 406 from the memory 105 to return the value 434 of 4 (e.g., the $2^{nd}$ value of the sparse vector 406). Likewise, the logic gate 204 performs a logic AND function with the mask 432 and the sparsity map 414. The element position determiner 212 determines an element position based on the ones count of the result from the logic gate 204. For example, in FIG. 4, the element position determiner 212 determines the element position to be three because there are three ones in the result of $B_M$ AND mask. The interface 200 accesses the element/value stored in the memory 105 at an address corresponding to the $3^{rd}$ position of the sparse vector 408 to return the value 436 of 6 (e.g., the $3^{rd}$ value of the sparse vector 408).

Once the interface 200 accesses the corresponding values 434, 436 (e.g., 3 and 6), the example multiplier 214 multiples the corresponding values 434, 436 to generate the first example product 438 (e.g., 18). Because this is not the first iteration, the example summer 216s the previously stored product 426 with the current product 438 (e.g., 488+18=506) to generate the current result 440. The example result storage 218 stores the current result. After the second iteration is complete, the example iterative control vector generator 202 subtracts the control vector 428 by one (e.g., C−1), illustrated in the context of FIG. 4, to generate the example difference vector 442 and performs a logic AND function with the control vector 428 and the difference vector 442. Because the result includes only zero values, illustrated in the context of FIG. 4, the iterative control vector generator 202 determines that a subsequent iteration is not needed and the dot product protocol is complete. Accordingly, the example interface 200 accesses the result stored in the example result storage 218 to output it as the dot product result 108.

While an example manner of implementing the example dot product calculator 106 of FIG. 1 is illustrated in FIG. 2, one or more of the elements, processes and/or devices illustrated in FIG. 2 may be combined, divided, re-arranged, omitted, eliminated and/or implemented in any other way. Further, the example interface 200, the example iterative control vector generator 202, the example logic gate 204, the example subtractor 206, the example trailing binary counter 208, the example mask generator 210, the example element position determiner 212, the example multiplier 214, the example summer 216, the example result storage 218, and/or, more generally, the example dot product calculator 106 of FIG. 2 may be implemented by hardware, software, firmware and/or any combination of hardware, software and/or firmware. Thus, for example, any of the example interface 200, the example iterative control vector generator 202, the example logic gate 204, the example subtractor 206, the example trailing binary counter 208, the example mask generator 210, the example element position determiner 212, the example multiplier 214, the example summer 216, the example result storage 218, and/or, more generally, the example dot product calculator 106 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 200, the example iterative control vector generator 202, the example logic gate 204, the example subtractor 206, the example trailing binary counter 208, the example mask generator 210, the example element position determiner 212, the example multiplier 214, the example summer 216, the example result storage 218, and/or, more generally, the example dot product calculator 106 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example dot product calculator 106 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
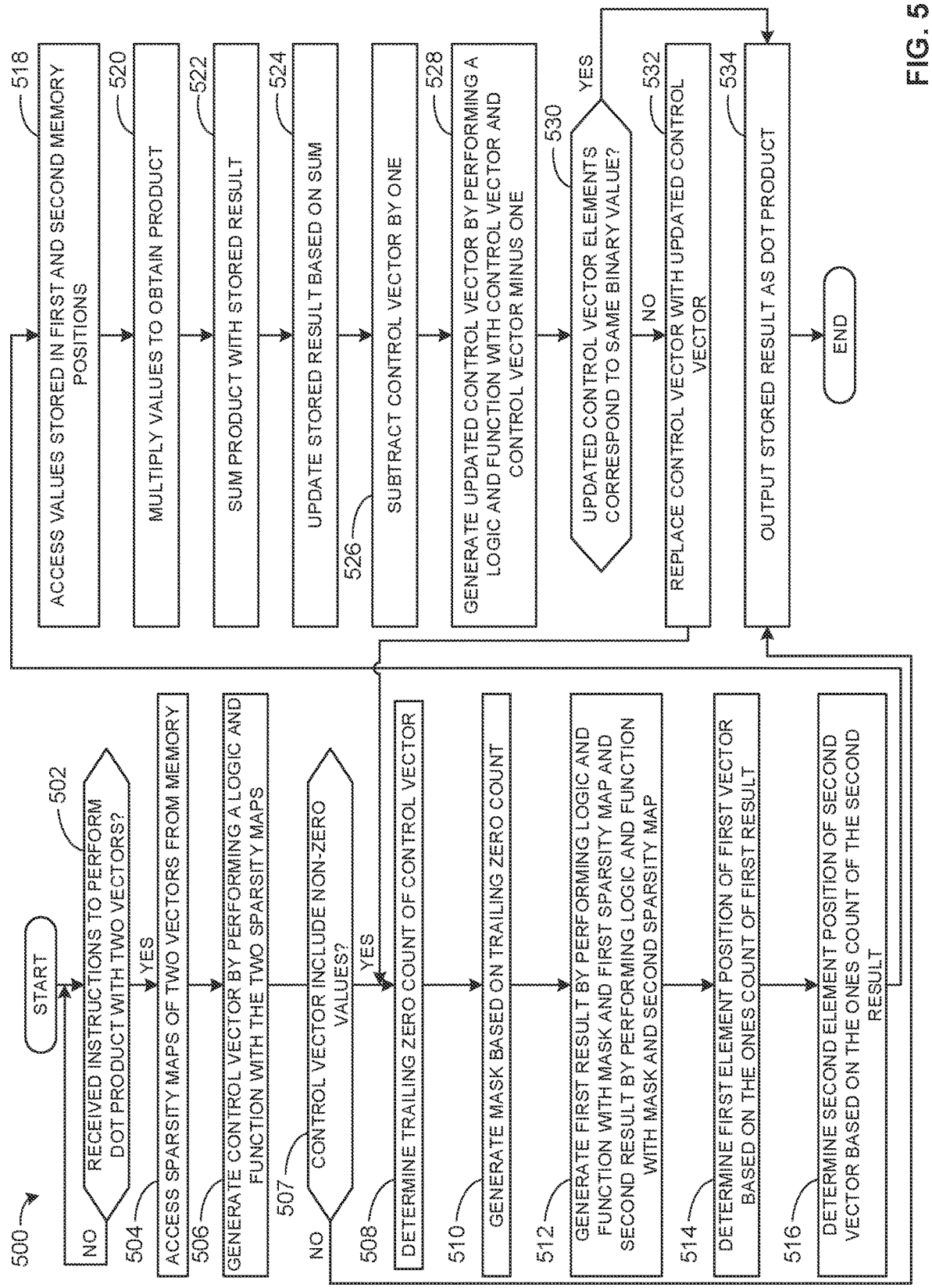
FIG. 5 is a flowchart representative of example machine readable instructions which may be executed to implement the example dot product calculator of FIGS. 1 and/or 2 to determine the dot product of two vectors using bitmaps of the two vectors.

A flowchart representative of example hardware logic, machine readable instructions, hardware implemented state machines, and/or any combination thereof for implementing the example dot product calculator 106 of FIG. 1 and/or FIG. 2 is shown in FIG. 5. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example dot product calculator 106 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 5 is an example flowchart 500 representative of example machine readable instructions that may be executed by the example implementation of the dot product calculator 106 of FIGS. 2 and/or 3 to perform a dot product calculation of two dense vectors using corresponding sparse vectors and sparsity maps. Although the flowchart 500 of FIG. 5 is described in conjunction with the example dot product calculator 106 of FIGS. 2 and/or 3, other type(s) of dot product calculator(s) and/or other type(s) of processor(s) may be utilized instead.

At block 502, the example dot product calculator 106 determines if instructions have been received (e.g., obtained) at the interface 200 to perform a dot product with two vectors. If the instructions to perform the dot product have not been received (block 502: NO), the process returns to block 502 until instructions are received. If instructions to perform a dot product with two vectors (A and B) have been received at the interface 200 (block 502: YES), the example dot product calculator 106 accesses the sparsity maps ($A_M$ and $B_M$) corresponding to the two vectors (A and B) from the example memory 105 (block 504). For example, the interface 200 communicates with the memory interface 104 of FIG. 5 to access the sparsity maps corresponding to the two vectors from the example memory 105.

At block 506, the example iterative control vector generator 202 generates a control vector (C) by performing a logic AND function with the two sparsity maps ($A_M$ and $B_M$). For example, the logic gate 204 performs the logic AND function to generate the control vector (e.g., $C=A_M$ AND $B_M$). In some examples, if the control vector C includes all zeros, the dot product is complete and the interface 200 outputs zero (e.g., prestored in the results storage 218) as the dot product result 108. If the control vector does not include non-zero values (block 507:NO), the result of the dot product is zero (e.g., no common non-zero elements between the two dense vectors) and the process continues to block 534 to output the result in the example result storage 218 (e.g., which is initiated to zero). If the control vector includes non-zero values (block 507: YES), the example trailing binary counter 208 determines the trailing binary count (e.g., the trailing zero count or the trailing one count) of the control vector (C) (block 508). For example, the trailing binary counter 208 of FIG. 2 determines how many of the least significant bits are zero before a one occurs in the control vector. (In other examples, the trailing bit counter 208 determines how many of the least significant bits are ones before a zero occurs in the control vector)

At block 510, the example mask generator 210 generates a mask vector based on the trailing zero/binary count. For example, the mask generator 210 may generate a vector with the same dimensions as the input vectors (A and B), where the first X (e.g., where X is the trailing zero count) least significant bits of the mask vector are '1' and the remaining bits of the mask vector are '0.' (In other example, the mask generator 210 may generate a vector with the same dimensions as the input vectors, where the first X least significant bits of the mask vector as '0' and the remaining bits of the mask vector are '1') At block 512, the example logic gate 204 generates a first result by performing a logic AND function with the mask and the first sparsity map $A_M$ (e.g., mask AND $A_M$) and a second result by performing a logic AND function with the mask and the second sparsity map $B_M$ (e.g., mask AND $B_M$).

At block 514, the example element position determiner 212 determines a first memory position of a first sparse vector ($A_S$) corresponding to the first vector (A) based on the ones count of the first result. For example, the element position determiner 212 counts the number of ones (e.g., a binary value) in the first result and determines the position of the sparse vector based on the number of ones (e.g., the binary value). At block 516, the example element position determiner 212 determines a second memory position of a second sparse vector ($B_S$) corresponding to the second vector (B) based on the ones count of the second result. For example, the element position determiner 212 counts the number of ones in the second result and determines the position of the sparse vector based on the number of ones.

At block 518, the example interface 200 access the values stored in the first and second positions of the sparse vectors ($A_S$ and $B_S$). For example, if the first sparse vector $A_S$ is [5; 316; 935; 17] and the first memory position is 2, the interface 200 access the value of 935 (e.g., corresponding to the $2^{nd}$ position of $A_S$, where 5 is in the $0^{th}$ position, 316 is in the $1^{st}$ position, 935 is in the $2^{nd}$ position, and 17 is the $3^{rd}$ position) from the sparse vector in stored in the example memory 105. At block 520, the example multiplier 214 multiplies the accessed values from the corresponding sparse vectors to obtain a product. For example, if the value accessed from the first sparse vector $A_S$ is 935 and the value accessed from the second sparse vector $B_S$ is 5, the multiplier 214 multiplies the values 935 and 5 to generate to product of 5,675.

At block 522, the summer 216 sums the product with the value stored in the result storage 218 (e.g., the stored result). At block 524, the result storage 218 updates the stored result based on the sum. During the first iteration, the value stored in the result storage 218 is zero. Accordingly, in some examples, during the first protocol, block 522 can be skipped and the result storage 218 can store the product as the stored result in the result storage 218. At block 526, the example subtractor 206 subtracts from the corresponding to value of the control vector C by one to generate the C−1 vector (e.g., a difference vector). For example, if the control vector C is [1, 0, 0, 0] (e.g., 8 in decimal), the subtractor 206 generates the vector C−1 to be [0, 1, 1, 1] (e.g., 7 in decimal).

At block 528, the example iterative control vector generator 202 generates an updated control vector by using the logic gate 204 to perform a logic AND function with the control vector (C) and the difference vector (C−1). At block 530, the example iterative control vector generator 202 determines if the elements of the updated control vector corresponds to all the same binary value (e.g., determines if each element of the updated control vector is a zero). If the example iterative control vector generator 202 determines that the updated control vector elements do not all correspond to the same binary value (block 530: NO), the iterative control vector generator 202 replaces the control vector with the updated control vector (block 532), and the process returns to block 508 to perform a subsequent iteration. If the example iterative control vector generator 202 determines that all of the elements of the updated control vector correspond to the same binary value (e.g., all zeros) (block 530: YES), the example interface 200 accesses the stored result in the result storage 218 and outputs the stored result as the dot product result 108 (block 534).

Figure 6:
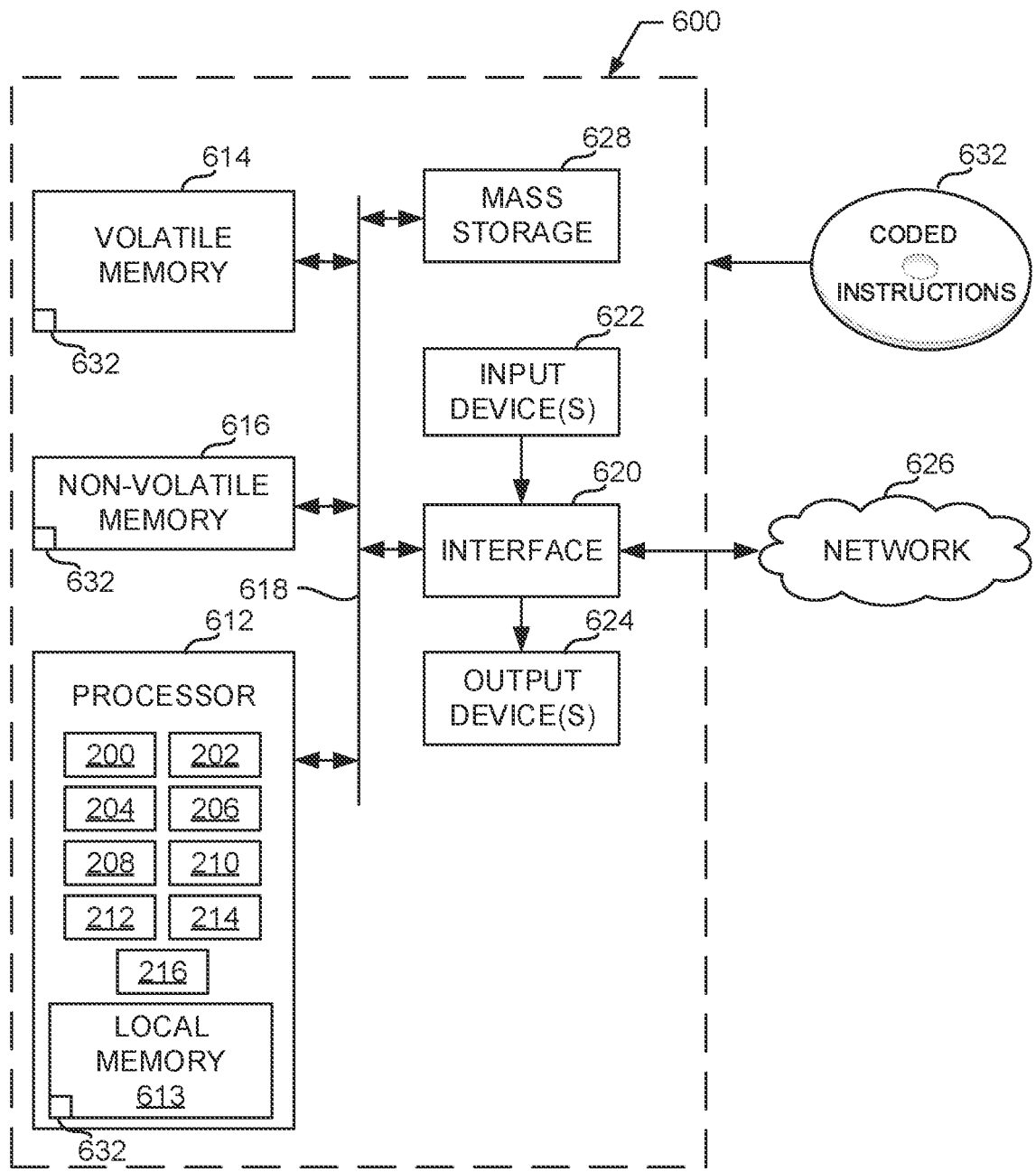
FIG. 6 is a block diagram of an example processing platform structured to execute the instructions of FIG. 5 to implement the example dot product calculator of FIGS. 1 and 2.

FIG. 6 is a block diagram of an example processor platform 1000 structured to execute the instructions of FIG. 5 to implement the example dot product calculator 106 of FIG. 2. The processor platform 600 can be, for example, a server, a personal computer, a workstation, a self-learning machine (e.g., a neural network), a mobile device (e.g., a cell phone, a smart phone, a tablet such as an iPad™), or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example interface 200, the example iterative control vector generator 202, the example logic gate 204, the example subtractor 206, the example trailing binary counter 208, the example mask generator 210, the example element position determiner 212, the example multiplier 214, and the example summer 216.

The processor 612 of the illustrated example includes a local memory 613 (e.g., a cache). In some examples, the local memory 613 implements the example result storage 218. The processor 612 of the illustrated example is in communication with a main memory including a volatile memory 614 and a non-volatile memory 616 via a bus 618. In some examples, the main memory implements the example memory 105. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that perform dot product calculations using sparse vectors. The disclosed methods, apparatus and articles of manufacture improve the efficiency of a computing device by decreasing the amount of memory required to store a large dense vector (e.g., a vector including both zero and non-zero values) by storing a smaller sparse vector (e.g., a vector that only includes non-zero values) and sparsity map/vector (e.g., a bitmap of the dense vector) corresponding to the large dense vector. Additionally, examples disclosed herein perform a dot product using the sparsity maps to reduce the amount of local memory needed to perform the dot product and reducing the amount of complex multiplication operations needed to perform the dot product related to prior techniques. Accordingly, examples disclosed herein improve the efficiency of a computing device by reducing the amount of processor resources (e.g., fewer processor cycles are needed to perform the same calculation) required to perform a dot product calculation, thereby increasing the speed of computing the dot product calculation. Disclosed methods, apparatus and articles of manufacture are accordingly directed to one or more improvement(s) in the functioning of a computer.

Example 1 includes a dot product calculator comprising a counter to determine a trailing binary count of a control vector, the control vector corresponding to a first result of a first logic and operation on a first bitmap of a first sparse vector and a second bitmap of a second sparse vector, a mask generator to generate a mask vector based on the trailing binary count, an interface to access a first value of the first sparse vector based on a second result of a second logic and operation on the first bitmap and the mask vector, and access a second value of the second sparse vector based on a third result of a third logic and operation on the second bitmap and the mask vector, and a multiplier to multiply the first value with the second value to generate a product.

Example 2 includes the dot product calculator of example 1, wherein the first bitmap is to identify whether first elements of the first vector respectively correspond to zero values or non-zero values and the second bitmap is to identify whether second elements of the second vector respectively correspond to zero values or non-zero values, and the first sparse vector corresponds to non-zero values of a first dense vector and the second sparse vector corresponds to non-zero values of a second dense vector.

Example 3 includes the dot product calculator of example 1, further including a logic gate to generate the control vector based on the first logic and operation with the first bitmap and the second bitmap as inputs.

Example 4 includes the dot product calculator of example 1, wherein the mask generator is to generate the mask vector to include a number of first binary values in the least significant bits, the number corresponding to the trailing binary count, the mask generator to generate the mast vector to have the same dimensions as the first vector.

Example 5 includes the dot product calculator of example 1, further including an element position determiner to determine a first number of binary values in the second result, the interface to access the first value based on a first address corresponding to the first number of binary values, and determine a second number of binary values in the third result, the interface to access the second value based on a second address corresponding to the second number of binary values.

Example 6 includes the dot product calculator of example 1, further including storage to store the product.

Example 7 includes the dot product calculator of example 1, further including a subtractor to generate a difference vector by subtracting one from a value corresponding to the binary bits of the control vector, and an iterative control vector generator to generate an updated control vector corresponding to a logic and operation on the control vector and the difference vector, and determine if all elements of the update control vector correspond to a same binary value.

Example 8 includes the dot product calculator of example 7, wherein the interface is to output the product as a dot product result when the iterative control vector generator determines that all the elements of the updated control vector correspond to the same binary value.

Example 9 includes the dot product calculator of example 7, wherein the trailing binary count is a first trailing binary count, the mask vector is a first mask vector, the product is a first product, and, when the iterative control vector generator determines that all the elements of the updated control vector do not correspond to the same binary value the counter is to determine a second trailing binary count of the updated control vector, the mask generator is to generate a second mask vector corresponding to the second trailing binary count, the interface is to access a third value of the first sparse vector based on a fourth result of a fourth logic and operation on the first bitmap and the second mask vector, access a fourth value of the second sparse vector based on a fifth result of a fifth logic and operation on the second bitmap and the second mask vector, and the multiplier is to multiply the third value by the fourth value to generate a second product, the apparatus further including a summer to sum the first product with the second product.

Example 10 includes the dot product calculator of example 9, wherein the difference vector is a first difference vector, the updated control vector is a first updated control vector, and the elements are first elements, and the subtractor is to generate a second difference vector by subtracting one from a value translation of the binary value of the updated control vector, and the iterative control vector generator is to generate a second updated control vector corresponding to a logic and operation on the updated control vector and the second difference vector, and the interface is to, when all second elements of the second updated control vector correspond to the same binary value, output a sum of the first product with the second product as a dot product result.

Example 11 includes at least one non-transitory computer readable storage medium comprising instructions which, when executed, cause a machine to at least determine a trailing binary count of a control vector, the control vector corresponding to a first result of a first logic and operation on a first bitmap of a first sparse vector and a second bitmap of a second sparse vector, generate a mask vector based on the trailing binary count, and multiply (a) a first value of the first sparse vector based on a second result of a second logic and operation on the first bitmap and the mask vector with (b) a second value of the second sparse vector corresponding to the second vector based on a third result of a third logic and operation on the second bitmap and the mask vector.

Example 12 includes the computer readable storage medium of example 11, wherein the first bitmap is to identify zero values or non-zero values of the first vector respectively and the second bitmap respectively is to identify zero values or non-zero values of the second vector, and the first sparse vector corresponds to non-zero values of a first dense vector and the second sparse vector corresponds to non-zero values of a second dense vector.

Example 13 includes the computer readable storage medium of example 11, wherein the instructions cause the machine to generate the control based on the first logic and operation with first bitmap and the second bitmap as inputs.

Example 14 includes the computer readable storage medium of example 11, wherein the instructions cause the machine to generate the mask vector to include a number of first binary values in the least significant bits, the number corresponding to the trailing binary count, the mask vector having the same dimensions as the first vector.

Example 15 includes the computer readable storage medium of example 11, wherein the instructions cause the machine to determine a first number of binary values in the second result, access the first value based on a first address corresponding to the first number of binary values, determine a second number of binary values in the third result, and access the second value based on a second address corresponding to the second number of binary values.

Example 16 includes the computer readable storage medium of example 11, wherein the instructions cause the machine to store the product of the first value and the second value in local memory.

Example 17 includes the computer readable storage medium of example 11, wherein the instructions cause the machine to generate a difference vector by subtracting one from a value corresponding to the binary bits of the control vector, generate an updated control vector corresponding to a logic and operation on the control vector and the difference vector, and determine if all elements of the update control vector correspond to a same binary value.

Example 18 includes the computer readable storage medium of example 17, wherein the instructions cause the machine to output the product of the first value and the second value as a dot product result when all the elements of the updated control vector correspond to the same binary value.

Example 19 includes the computer readable storage medium of example 17, wherein the trailing binary count is a first trailing binary count, the mask vector is a first mask vector, the product is a first product, and, the instructions to cause the machine to, when all the elements of the updated control vector do not correspond to the same binary value determine a second trailing binary count of the updated control vector, generate a second mask vector corresponding to the second trailing binary count, access a third value of the first sparse vector based on a fourth result of a fourth logic and operation on the first bitmap and the second mask vector, access a fourth value of the second sparse vector based on a fifth result of a fifth logic and operation on the second bitmap and the second mask vector, and multiply the third value by the fourth value to generate a second product, and sum the first product with the second product.

Example 20 includes the computer readable storage medium of example 19, wherein the difference vector is a first difference vector, the updated control vector is a first updated control vector, and the elements are first elements, and, the instruction cause the machine to generate a second difference vector by subtracting one from a value translation of the binary value of the updated control vector, generate a second updated control vector corresponding to a logic and function between the updated control vector and the second difference vector, and when all second elements of the second updated control vector correspond to the same binary value, output a sum of the first product with the second product as a dot product result.

Example 21 includes a method to determine a dot product between two vectors, the method comprising determining, with at least one logic circuit, a trailing binary count of a control vector, the control vector corresponding to a first result of a first logic and operation on a first bitmap of a first vector and a second bitmap of a second vector, generating, with the at least one logic circuit, a mask vector corresponding to the trailing binary count, accessing a first value of a first sparse vector corresponding to the first vector based on a second result of a second logic and operation on the first bitmap and the mask vector, and accessing a second value of a second sparse vector corresponding to the second vector based on a third result of a third logic and operation on the second bitmap and the mask vector, and multiplying, with the at least one logic circuit, the first value with the second value to generate a product.

Example 22 includes the method of example 21, wherein the first bitmap corresponds to whether first elements of the first vector correspond to zero values or non-zero values and the second bitmap corresponds to whether second elements of the second vector correspond to zero values or non-zero values, and the first sparse vector corresponds to non-zero values of the first vector and the second sparse vector corresponds to non-zero values of the second vector.

Example 23 includes the method of example 21, further including generating the control vector based on the first logic and operation with first bitmap and the second bitmap as inputs.

Example 24 includes the method of example 21, further including generating the mask vector to include a number of first binary values in the least significant bits, the number corresponding to the trailing binary count, the mask vector having the same dimensions as the first vector.

Example 25 includes the method of example 21, further including determining a first number of binary values in the second result, accessing the first value based on a first address corresponding to the first number of binary values, determining a second number of binary values in the third result, and accessing the second value based on a second address corresponding to the second number of binary values.

Example 26 includes the method of example 21, further including storing the product of the first value and the second value in local memory.

Example 27 includes the method of example 21, further including generating a difference vector by subtracting one from a value corresponding to the binary bits of the control vector, generating an updated control vector corresponding to a logic and operation on the control vector and the difference vector, and determining if all elements of the update control vector correspond to a same binary value.

Example 28 includes the method of example 27, further including outputting the product of the first value and the second value as a dot product result when all the elements of the updated control vector correspond to the same binary value.

Example 29 includes the method of example 27, wherein the trailing binary count is a first trailing binary count, the mask vector is a first mask vector, the product is a first product, and, further including, when all the elements of the updated control vector do not correspond to the same binary value determining a second trailing binary count of the updated control vector, generating a second mask vector corresponding to the second trailing binary count, accessing a third value of the first sparse vector based on a fourth result of a fourth logic and operation on the first bitmap and the second mask vector, accessing a fourth value of the second sparse vector based on a fifth result of a fifth logic and operation on the second bitmap and the second mask vector, multiplying the third value by the fourth value to generate a second product, and summing the first product with the second product.

Example 30 includes the method of example 29, wherein the difference vector is a first difference vector, the updated control vector is a first updated control vector, and the elements are first elements, and, further including generating a second difference vector by subtracting one from a value translation of the binary value of the updated control vector, generating a second updated control vector corresponding to a logic and operation on the updated control vector and the second difference vector, and when all second elements of the second updated control vector correspond to the same binary value, outputting a sum of the first product with the second product as a dot product result.

Example 31 includes a dot product calculator comprising first means for determining a trailing binary count of a control vector, the control vector corresponding to a first result of a first logic and operation on a first bitmap of a first sparse vector and a second bitmap of a second sparse vector, second means for generating a mask vector based on the trailing binary count, third means for accessing a first value of the first sparse vector based on a second result of a second logic and operation on the first bitmap and the mask vector, and accessing a second value of the second sparse vector based on a third result of a third logic and operation on the second bitmap and the mask vector, and fourth means for multiplying the first value with the second value to generate a product.

Example 32 includes the dot product calculator of example 31, wherein the first bitmap is to identify whether first elements of the first vector respectively correspond to zero values or non-zero values and the second bitmap is to identify whether second elements of the second vector respectively correspond to zero values or non-zero values, and the first sparse vector corresponds to non-zero values of a first dense vector and the second sparse vector corresponds to non-zero values of a second dense vector.

Example 33 includes the dot product calculator of example 31, further including fifth means for generating the control vector based on the first logic and operation with the first bitmap and the second bitmap as inputs.

Example 34 includes the dot product calculator of example 31, wherein the second means includes means for generating the mask vector to include a number of first binary values in the least significant bits, the number corresponding to the trailing binary count, the second means including means for generating the mast vector to have the same dimensions as the first vector.

Example 35 includes the dot product calculator of example 31, further including sixth means for determining a first number of binary values in the second result, the third means including means for accessing the first value based on a first address corresponding to the first number of binary values, and determining a second number of binary values in the third result, the third means including means for accessing the second value based on a second address corresponding to the second number of binary values.

Example 36 includes the dot product calculator of example 31, further including seventh means for storing the product.

Example 37 includes the dot product calculator of example 31, further including eighth means for generating a difference vector by subtracting one from a value corresponding to the binary bits of the control vector, and ninth means for generating an updated control vector corresponding to a logic and operation on the control vector and the difference vector, and determining if all elements of the update control vector correspond to a same binary value.

Example 38 includes the dot product calculator of example 37, wherein the third means includes means for outputting the product as a dot product result when the iterative control vector generator determines that all the elements of the updated control vector correspond to the same binary value.

Example 39 includes the dot product calculator of example 37, wherein the trailing binary count is a first trailing binary count, the mask vector is a first mask vector, the product is a first product, and, when the iterative control vector generator determines that all the elements of the updated control vector do not correspond to the same binary value the first means including means for determining a second trailing binary count of the updated control vector, the second means includes means for generating a second mask vector corresponding to the second trailing binary count, the third means including means for accessing a third value of the first sparse vector based on a fourth result of a fourth logic and operation on the first bitmap and the second mask vector, and accessing a fourth value of the second sparse vector based on a fifth result of a fifth logic and operation on the second bitmap and the second mask vector, and the fourth means including means for multiplying the third value by the fourth value to generate a second product, the apparatus further including a summer to sum the first product with the second product.

Example 40 includes the dot product calculator of example 39, wherein the difference vector is a first difference vector, the updated control vector is a first updated control vector, and the elements are first elements, and the eight means includes means for generating a second difference vector by subtracting one from a value translation of the binary value of the updated control vector, and the ninth means includes means for generating a second updated control vector corresponding to a logic and operation on the updated control vector and the second difference vector, and the third means including means for, when all second elements of the second updated control vector correspond to the same binary value, outputting a sum of the first product with the second product as a dot product result.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. Circuitry to calculate a dot product, the circuitry comprising:
   first circuitry to perform a first logic operation with a first input vector and a second input vector, the first circuitry to output a control vector;
   second circuitry to perform a second logic operation with a difference vector and an inverse of the control vector, the difference vector corresponding to a value representative of the control vector minus one, the second circuitry to output a mask vector;
   third circuitry to perform a third logic operation with the mask vector and the first input vector, the third circuitry to output a first vector;
   a first counter to generate a first count based on a first total number of ones of the first vector;
   fourth circuitry to perform a fourth logic operation with the mask vector and the second input vector, the fourth circuitry to output a second vector;
   a second counter to generate a second count based on a second total number of ones of the second vector; and
   multiplier circuitry to multiply a first value based on the first ones count and a second value based on the second ones count to generate a product.
2. The circuitry of claim 1, further including:
   fifth circuitry to generate the inverse of the control vector; and
   subtractor circuitry to generate the difference vector.

3. The circuitry of claim 1, wherein the first input vector is a first sparsity map, the second input vector is a second sparsity map, and further including:
fifth circuitry to identify a first address of the first value in memory by performing a fifth logic operation with the first ones count and a first base address corresponding to a first location of a first sparse vector in the memory, the first sparse vector corresponding to the first sparsity map; and
sixth circuitry to identify a second address of the second value in the memory by performing a sixth logic operation with the second ones count and a second base address corresponding to a second location of a second sparse vector in the memory, the second sparse vector corresponding to the second sparsity map.

4. The circuitry of claim 1, further including summer circuitry to sum the product with a value corresponding to a previous iteration, the value corresponding to at least one of a previous product from the previous iteration or a sum of previous products from the previous iteration.

5. The circuitry of claim 4, further including a storage device to store the sum of the previous products from the previous iteration.

6. The circuitry of claim 4, wherein the previous product is zero if there is no previous iteration.

7. The circuitry of claim 1, further including:
fifth circuitry to generate an updated control vector corresponding to a fifth logic operation on the control vector and the difference vector; and
a comparator to determine if elements of the update control vector correspond to a same binary value.

8. The circuitry of claim 7, wherein the comparator is to:
output a first signal to indicate a dot product calculation is complete when the update control vector corresponds to the same binary value; and
output a second signal to indicate a subsequent iteration is needed when the update control vector does not correspond to the same binary value.

9. The circuitry of claim 1, further including an interface to obtain the first value from memory based on the first ones count and obtain the second value from the memory based on the second ones count.

10. Circuitry to calculate a dot product, the circuitry comprising:
means for generating a control vector by performing a first logic operation with a first input vector and a second input vector;
means for generating a mask vector by performing a second logic operation with a difference vector and an inverse of the control vector, the difference vector corresponding to a value representative of the control vector minus one;
means for generating a first vector by performing a third logic operation with the mask vector and the first input vector;
means for generating a first ones count based on a first total number of ones of the first vector;
means for generating a second vector by performing a fourth logic operation with the mask vector and the second input vector;
means for generating a second ones count based on a second total number of ones of the second vector; and
means for multiplying a first value based on the first ones count and a second value based on the second ones count to generate a product.

11. The circuitry of claim 10, further including:
means for generating the inverse of the control vector; and
means for generating the difference vector.

12. The circuitry of claim 10, wherein the first input vector is a first sparsity map, the second input vector is a second sparsity map, and further including:
means for identifying a first address of the first value in memory by performing a fifth logic operation with the first ones count and a first base address corresponding to a first location of a first sparse vector in the memory, the first sparse vector corresponding to the first sparsity map; and
means for identifying a second address of the second value in the memory by performing a sixth logic operation with the second ones count and a second base address corresponding to a second location of a second sparse vector in the memory, the second sparse vector corresponding to the second sparsity map.

13. The circuitry of claim 10, further including means for summing the product with a value corresponding to a previous iteration, the value corresponding to at least one of a previous product from the previous iteration or a sum of previous products from the previous iteration.

14. The circuitry of claim 13, further including means for storing the sum of the previous products from the previous iteration.

15. The circuitry of claim 13, wherein the previous product is zero if there is no previous iteration.

16. The circuitry of claim 10, further including:
means for generating an updated control vector corresponding to a fifth logic operation on the control vector and the difference vector; and
means for determining if elements of the update control vector correspond to a same binary value.

17. The circuitry of claim 16, wherein the means for determining if the element of the updated control vector correspond to the same binary value is to:
output a first signal to indicate a dot product calculation is complete when the update control vector corresponds to the same binary value; and
output a second signal to indicate a subsequent iteration is needed when the update control vector does not correspond to the same binary value.

18. The circuitry of claim 10, further including means for obtaining the first value from memory based on the first ones count and obtain the second value from the memory based on the second ones count.

19. A dot product calculator comprising:
means for generating a mask vector based on a first logic operation on a difference vector and an inverse of a control vector, the control vector based on a first bitmap of a first sparse vector and a second bitmap of a second sparse vector, the difference vector corresponding to a first value representative of a difference between a second value of the control vector and one;
means for generating a first product of a third value from the first sparse vector and a fourth value from the second sparse vector, the third value based on (i) the mask vector and (ii) a second sparsity map based on the first sparse vector, the fourth value corresponding to (i) the mask vector and (ii) the second sparsity map corresponding to the second sparse vector; and
means for adding the first product to a second product of a previous iteration.

20. The dot product calculator of claim 19, wherein:
the first value of the first sparse vector is based on a result of a second logic operation on (a) the first bitmap and (b) the mask vector, and
the fourth value of the second sparse vector is based on a result of a third logic operation on (a) the second bitmap and (b) the mask vector.

21. The dot product calculator of claim 20, further including means for:
determining a first number of binary values in the result of the second logic operation, the first value based on a first address corresponding to the first number of binary values; and
determining a second number of binary values in the result of the third logic operation, the second value based on a second address corresponding to the second number of binary values.

22. The dot product calculator of claim 19, wherein:
the first bitmap is to identify whether a first element of a first vector corresponds to a zero value or a non-zero value, and, the second bitmap is to identify whether a second element of a second vector corresponds to a zero value or a non-zero value; and
the first sparse vector corresponds to non-zero values of a first dense vector, and, the second sparse vector corresponds to non-zero values of a second dense vector.

23. The dot product calculator of claim 22, wherein the means for generating the mask vector is to:
generate the mask vector to include a number of first binary values in the least significant bits of the first vector, the number of the first binary values represented by a trailing binary count corresponding to the mask vector; and
generate the mask vector to have the same dimensions as the first vector.

24. The dot product calculator of claim 19, further including means for generating the control vector based on the first logic operation with the first bitmap and the second bitmap as inputs.

25. The dot product calculator of claim 19, further including means for storing the first product.

26. The dot product calculator of claim 19, further including means for generating the difference vector by subtracting one from the value representative of the control vector, further including means for updating the control vector, the means for updating the control vector to:

generate an updated control vector corresponding to a second logic operation on the control vector and the difference vector; and
determine if elements of the update control vector correspond to a same value as the value representative of the control vector.

27. The dot product calculator of claim 26, further including means for outputting a sum of the first product and the second product as a dot product result when the elements of the updated control vector correspond to the same value as the value representative of the control vector.

28. The dot product calculator of claim 26, wherein the difference vector is a first difference vector, the mask vector is a first mask vector, and, when the elements of the updated control vector do not correspond to the same value as the value representative of the control vector:
the means for generating the mask vector is to generate a second mask vector based on a second difference vector and the updated control vector;
the means for generating the first product is to multiply a fifth value of the first sparse vector and a sixth value of the second sparse vector to generate a third product; and
the means for adding is to sum (i) the third product and (ii) the sum of (a) the first product and (b) the second product.

29. The dot product calculator of claim 28, wherein the updated control vector is a first updated control vector, and the elements are first elements, wherein:
the means for generating the difference vector is to generate the second difference vector by subtracting one from the value representative of the updated control vector; and
the means for updating the control vector is to generate a second updated control vector corresponding to a third logic operation on the updated control vector and the second difference vector.

30. The dot product calculator of claim 29, further including means for outputting the sum of (i) the third product and (ii) the sum of (a) the first product and (b) the second product as a dot product result when second elements of the second updated control vector correspond to the same value as the value representative of the control vector.

* * * * *